(12) United States Patent
Marriott et al.

(10) Patent No.: US 9,303,605 B2
(45) Date of Patent: Apr. 5, 2016

(54) SYSTEM AND METHOD FOR CIRCULATING FUEL THROUGH A DIRECT INJECTION PUMP OF A BI-FUEL ENGINE

(75) Inventors: Craig D. Marriott, Clawson, MI (US); Ben W. Moscherosch, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1182 days.

(21) Appl. No.: 13/293,406

(22) Filed: Nov. 10, 2011

(65) Prior Publication Data

US 2013/0118449 A1    May 16, 2013

(51) Int. Cl.
*F02M 37/00* (2006.01)
*F02M 53/00* (2006.01)
*F02M 43/02* (2006.01)
*F02M 31/20* (2006.01)
*F02B 69/02* (2006.01)
*F02D 19/06* (2006.01)
*F02M 63/00* (2006.01)

(52) U.S. Cl.
CPC ........... *F02M 53/00* (2013.01); *F02D 19/0668* (2013.01); *F02D 19/0684* (2013.01); *F02M 31/205* (2013.01); *F02M 43/02* (2013.01); *F02B 69/02* (2013.01); *F02D 19/0644* (2013.01); *F02D 19/0647* (2013.01); *F02M 63/0001* (2013.01); *F02M 2200/315* (2013.01); *Y02T 10/126* (2013.01); *Y02T 10/36* (2013.01)

(58) Field of Classification Search
CPC ....... F02M 69/04; F02M 39/02; F02M 43/00; Y02T 10/32; F02D 41/0027; F04B 49/065; F04B 49/06; F04B 2205/11; F04C 2270/19; F04C 28/28
USPC ......... 123/445, 446, 464, 495, 525, 575, 527, 123/514, 41.31, 541, 557, 515, 698; 417/32, 292
See application file for complete search history.

(56) References Cited

U.S. PATENT DOCUMENTS 4,625,701 A * 12/1986 Bartlett et al. ................ 123/514
5,755,211 A    5/1998 Koch
(Continued)

FOREIGN PATENT DOCUMENTS

CN    2934630 Y    8/2007
CN    200961521 Y    10/2007
(Continued)

*Primary Examiner* — Hai Huynh
*Assistant Examiner* — Raza Najmuddin
(74) *Attorney, Agent, or Firm* — Quinn Law Group, PLLC

(57) ABSTRACT

A fuel supply system for supplying a bi-fuel engine with a first fuel type, e.g., gasoline, includes a cooling circuit. The cooling circuit circulates the first fuel type through a direct injection pump assembly to prevent the first fuel type from overheating within the direct injection pump assembly.

20 Claims, 2 Drawing Sheets

(56) References Cited

U.S. PATENT DOCUMENTS

| | | | |
|---|---|---|---|
| 6,230,688 B1 * | 5/2001 | Faix et al. | 123/495 |
| 6,742,479 B2 * | 6/2004 | Yanagisawa | 123/1 A |
| 6,748,923 B2 * | 6/2004 | Zander et al. | 123/446 |
| 7,263,973 B2 * | 9/2007 | Akita et al. | 123/431 |
| 7,770,562 B2 * | 8/2010 | Pursifull et al. | 123/446 |
| 7,954,477 B2 * | 6/2011 | Gruber et al. | 123/514 |
| 8,078,386 B2 * | 12/2011 | Stein et al. | 701/104 |
| 8,371,267 B2 * | 2/2013 | Kristen et al. | 123/446 |
| 8,590,510 B2 * | 11/2013 | Surnilla et al. | 123/431 |
| 8,776,764 B2 * | 7/2014 | Basmaji et al. | 123/495 |
| 2011/0023832 A1 | 2/2011 | Brown et al. | |
| 2011/0155102 A1 * | 6/2011 | Ten Broeke | 123/446 |
| 2011/0290203 A1 * | 12/2011 | Pursifull | 123/41.08 |
| 2012/0312280 A1 * | 12/2012 | Jaasma | 123/456 |

FOREIGN PATENT DOCUMENTS

| | | |
|---|---|---|
| CN | 101285435 A | 10/2008 |
| CN | 201963413 U | 9/2011 |
| DE | 102004011414 A1 | 4/2005 |

\* cited by examiner

SYSTEM AND METHOD FOR CIRCULATING FUEL THROUGH A DIRECT INJECTION PUMP OF A BI-FUEL ENGINE

TECHNICAL FIELD

The invention generally relates to a fuel supply system for supplying a bi-fuel engine of a vehicle with gasoline, and to a method of operating the vehicle.

BACKGROUND

Bi-fuel engines are capable of operating on two different fuel types, i.e., a first fuel type and a second fuel type. Typically, the first fuel type includes either gasoline or diesel fuel, and the second fuel type includes an alternative fuel, such as but not limited to Compressed Natural Gas (CNG), Liquefied Petroleum Gas (LPG) or hydrogen. The two different fuels are stored in separate tanks, and the bi-fuel engine may run on one fuel at a time, or may alternatively run on a combination of the first fuel type and the second fuel type.

Some bi-fuel engines utilize a direct injection assembly having a high pressure pump that is directly attached to the engine for increasing the pressure of the first fuel type, e.g., gasoline, which is then injected directly into the combustion chambers of the engine. When the bi-fuel engine is operating on the second fuel type, the first fuel type remains stagnant within its fuel supply system. As such, the fuel disposed within the direct injection assembly directly adjacent the bi-fuel engine, and particularly the high pressure pump, becomes heated. Overheating of the first fuel type may cause vaporization of the first fuel type within the direct injection assembly.

SUMMARY

A vehicle is provided. The vehicle includes a bi-fuel engine that is independently operable on a first fuel type, a second fuel type, or a combination of the first fuel type and the second fuel type. A fuel supply system is coupled to the bi-fuel engine. The fuel supply system supplies the bi-fuel engine with the first fuel type. The fuel supply system includes a tank that stores a liquid supply of the first fuel type. A lift pump is disposed in fluid communication with the tank, and pressurizes and circulates the first fuel type through the fuel supply system. A direct injection assembly is directly coupled to the bi-fuel engine. The direct injection assembly is in fluid communication with the lift pump for receiving the first fuel type therefrom, and is in fluid communication with the bi-fuel engine for supplying the first fuel type thereto. The fuel supply system further includes a cooling circuit in fluid communication with the direct injection assembly. The cooling circuit circulates the first fuel type through the direct injection assembly to cool the first fuel disposed within the direct injection assembly when the bi-fuel engine is operating on the second fuel type.

A method of operating a vehicle is also provided. The method includes operating a bi-fuel engine, which is independently operable on a first fuel type, a second fuel type, or on a combination of the first fuel type and the second fuel type. The first fuel type is circulated through a direct injection assembly that is coupled to the bi-fuel engine to cool the first fuel type when the bi-fuel engine is operating on the second fuel type, thereby preventing vaporization of the first fuel type within the direct injection assembly.

Accordingly, the cooling circuit continuously circulates the first fuel type, e.g., gasoline, through the direct injection assembly when the bi-fuel engine is operating on the second fuel type, thereby preventing the first fuel type from becoming overheated within the direct injection assembly, and possibly vaporizing.

The above features and advantages and other features and advantages of the present invention are readily apparent from the following detailed description of the best modes for carrying out the invention when taken in connection with the accompanying drawings.

DETAILED DESCRIPTION

Figure 1:
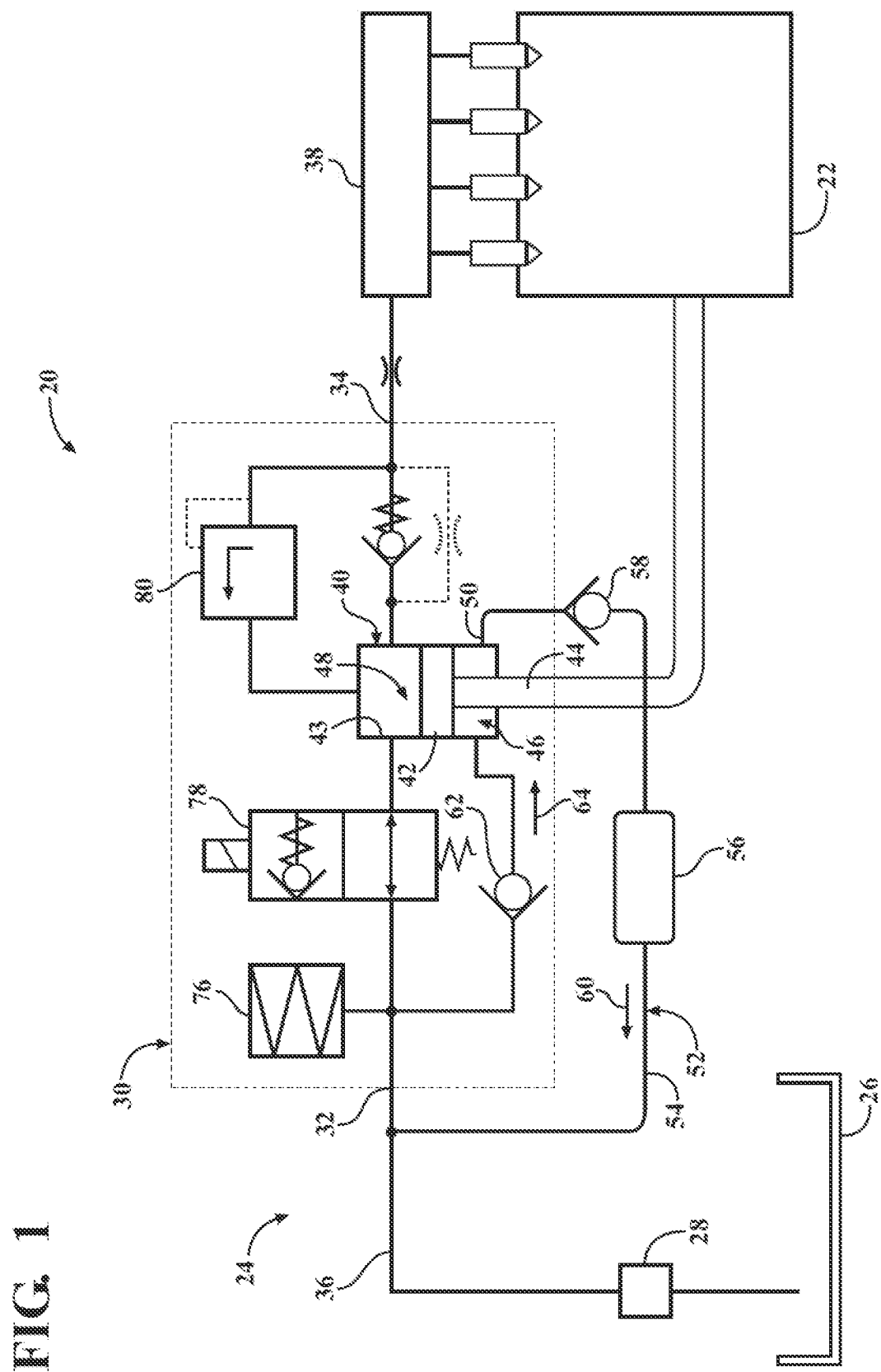
FIG. 1 is a schematic drawing of a fuel system for a bi-fuel engine showing a first embodiment of a cooling circuit.

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, a vehicle is generally shown at 20. Referring to both FIGS. 1 and 2, the vehicle 20 includes a bi-fuel engine 22. The bi-fuel engine 22 is independently operable on either of a first fuel type or a second fuel type. In other words, the bi-fuel engine 22 may run on the first fuel type, or may alternatively run on the second fuel type. The first fuel type may include, for example, one of gasoline or diesel fuel. The second fuel type may include, for example, one of compressed natural gas, liquefied petroleum gas, or hydrogen.

The vehicle 20 includes a first fuel supply system 24. The first fuel supply system 24 is coupled to the bi-fuel engine 22, and supplies the bi-fuel engine 22 with the first fuel type. It should be appreciated that the vehicle 20 may further include a second fuel supply system (not shown) that is coupled to the bi-fuel engine 22 and supplies the bi-fuel engine 22 with the second fuel type.

The first fuel supply system 24, for supplying the first fuel type to the bi-fuel engine 22, includes a tank 26 for storing a liquid supply of the first fuel type, and a lift pump 28 in fluid communication with the tank 26. The lift pump 28, i.e., a fuel pump, pressurizes and circulates the first fuel type through the first fuel supply system 24. The tank 26 may include any size, shape and configuration suitable for storing the first fuel type. Similarly, the lift pump 28 may include any size, style and/or configuration suitable for use with the first fuel type, and capable of providing the required lift for the first fuel supply system 24.

The first fuel supply system 24 further includes a direct injection pump assembly 30. The direct injection pump assembly 30 is in fluid communication with the lift pump 28 for receiving the first fuel type therefrom. The direct injection pump assembly 30 includes a low pressure inlet 32 for receiving the first fuel type from the lift pump 28. A supply line 36 interconnects the lift pump 28 and the low pressure inlet 32 in fluid communication. The direct injection pump assembly 30 is coupled to and in fluid communication with the bi-fuel engine 22 for supplying the first fuel type thereto. The direct injection pump assembly 30 includes a high pressure outlet 34 for supplying the first fuel type to the bi-fuel engine 22. As shown, the high pressure outlet 34 may be in fluid communication with a fuel rail having a plurality of direct injectors 38, which then directly injects the first fuel type into each combustion chamber of the bi-fuel engine 22.

Figure 2:
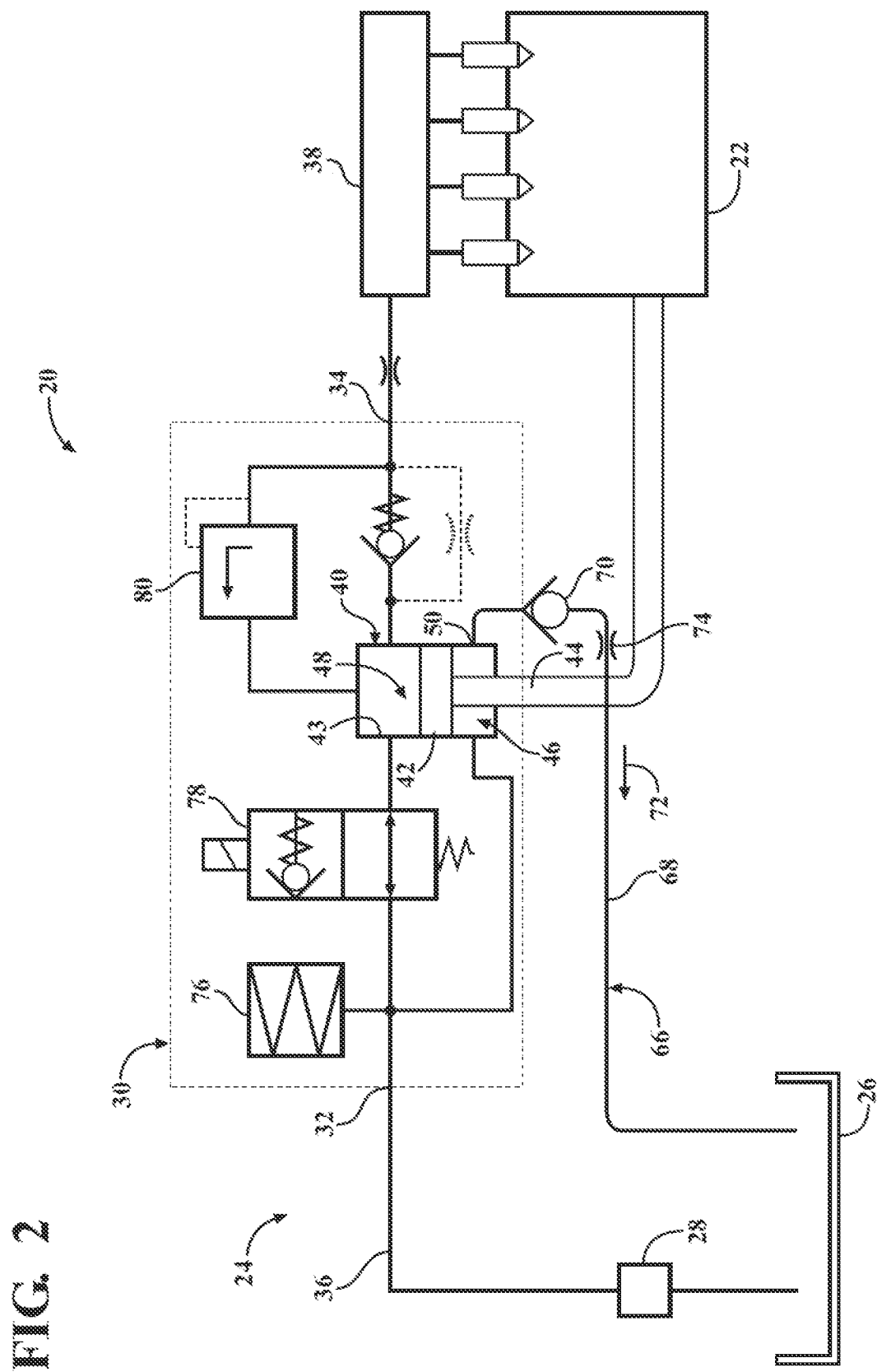
FIG. 2 is a schematic drawing of the fuel system for the bi-fuel engine showing a second embodiment of a cooling circuit.

The direct injection pump assembly 30 includes a high pressure pump 40. The high pressure pump 40 may be drivenly coupled to the bi-fuel engine 22, i.e., rotation of the bi-fuel engine 22 drives the high pressure pump 40. The high pressure pump 40 is driven by the bi-fuel engine 22 whenever the bi-fuel is running, whether on the first fuel type or the second fuel type. The high pressure pump 40 interconnects the low pressure inlet 32 and the high pressure outlet 34 in fluid communication, and operates to increase the pressure of the first fuel type for injection into the bi-fuel engine 22. As shown in FIGS. 1 and 2, the pump is shown as a piston 42 reciprocally moveable within a bore 43 and connected to the bi-fuel engine 22 via a rod 44. The high pressure pump 40 includes a low pressure side 46 in fluid communication with the low pressure inlet 32, and a high pressure side 48 in fluid communication with the high pressure outlet 34. As shown, the rod 44 extends through the low pressure side 46 of the high pressure pump 40, thereby reducing the swept volume of the low pressure side 46 relative to the high pressure side 48 of the high pressure pump 40. The high pressure pump 40 shown in FIG. 1 represents a pump in which the swept volume is greater than zero. The high pressure pump 40 shown in FIG. 2 represents a pump in which the swept volume is equal to zero.

As is known in the art and as shown in the Figures, the direct injection pump assembly 30 may further include a variable damper 76, a combined inlet and control valve 78, and a pressure relief valve 80. The variable damper 76, the inlet and control valve 78 and the pressure relief valve 80 are all interconnected and operate in conjunction with each other and the high pressure pump 40 in a manner known to those skilled in the art.

The first fuel supply system 24 further includes a cooling circuit 52, 66. The cooling circuit 52, 66 is in fluid communication with the direct injection pump assembly 30, and circulates the first fuel type through the direct injection pump assembly 30 to cool the first fuel disposed within the direct injection pump assembly 30 when the bi-fuel engine 22 is operating, i.e., when the bi-fuel engine 22 is running on either the first fuel type, the second fuel type, or a combination of the first fuel type and the second fuel type. The cooling circuit 52, 66 may be internal to the direct injection pump assembly 30, or may alternatively be external to the direct injection pump assembly 30. Circulating the first fuel type through the direct injection pump assembly 30 when the bi-fuel engine 22 is operating reduces the temperature of the first fuel type within the direct injection pump assembly 30, and particularly within the high pressure pump 40, thereby working to prevent vaporization of the first fuel type within the direct injection pump assembly 30. Preferably, the first fuel type is circulated from the low pressure side 46 of the direct injection pump assembly 30 to one of the fuel system supply line 36 upstream of the inlet into the direct injection pump assembly 30, such as shown in FIG. 1, or to the fuel storage tank 26, such as shown in FIG. 2.

As shown in the Figures, the cooling circuit 52, 66 includes an outflow 50 in fluid communication with the low pressure side 46 of the high pressure pump 40. However, it should be appreciated that the outflow 50 may be connected to and in fluid communication with the direct injection pump assembly 30 at some other location disposed along a low pressure fluid flow path of the direct injection pump assembly 30.

Referring specifically to FIG. 1, a first embodiment of the cooling circuit is shown generally at 52. The cooling circuit 52 includes a cooling line 54 interconnecting the outflow 50 and the supply line 36 in fluid communication. Operation of the high pressure pump 40 by the bi-fuel engine 22 circulates the first fuel type from the low pressure side 46 of the high pressure pump 40, through the cooling circuit 52, and back to the supply line 36. The cooling circuit 52 may include a heat exchanger 56 in fluid communication with the cooling line 54. The heat exchanger 56 is configured to remove heat from the first fuel type circulating therethrough. The heat exchanger 56 may include any suitable type, size and/or style of heat exchanger 56, such as a radiator or other similar device. Alternatively, the cooling line 54 may be configured to dissipate heat from the first fuel type circulating therethrough.

The cooling circuit 52 includes a first check valve 58 disposed therein. The first check valve 58 is configured to allow fluid communication or flow in a direction, indicated by arrow 60, from the low pressure side 46 of the high pressure pump 40, through the cooling circuit 52, and back to the supply line 36, and is configured to prevent fluid communication or flow in an opposite direction. The first check valve 58 may include any suitable type, size, style and/or configuration of check valve suitable for use in the fuel supply system 24.

The cooling circuit 52 requires that the direct injection pump assembly 30 include a second check valve 62, which is disposed between the low pressure inlet 32 and the low pressure side 46 of the high pressure pump 40. The second check valve 62 is configured to allow fluid communication or flow in a direction, indicated by arrow 64, from the low pressure inlet 32 toward the low pressure side 46 of the high pressure pump 40, and is configured to prevent fluid communication or flow in an opposite direction. The second check valve 62 may include any suitable type, size, style and/or configuration of check valve suitable for use in the fuel supply system 24.

Referring to FIG. 2, a second embodiment of the cooling circuit is shown generally at 66. The cooling circuit 66 includes a return line 68 interconnecting the outflow 50 and the tank 26 in fluid communication. Actuation of the lift pump 28 when the bi-fuel engine 22 is operating on either the first fuel type, the second fuel type or a combination of the first fuel type and the second fuel type, circulates the first fuel type through the low pressure side 46 of the pump, through the return line 68, and back into the tank 26. The return line 68 may be configured to dissipate heat from the first fuel type flowing therethrough. Further, heat from the first fuel type circulated through the direct injection pump assembly 30 and back into the tank 26, may be dissipated into the larger volume of fuel stored within the tank 26, which is ultimately dissipated to the outside air through the tank over a period of time.

The cooling circuit 66 includes a back pressure relief valve 70. The back pressure relief valve 70 allows fluid communication in a direction, indicated by arrow 72, from the low pressure side 46 of the high pressure pump 40, through the cooling circuit 66, and back to the tank 26 when a fluid pressure of the first fuel type is greater than a pre-determined value. The back pressure relief valve 70 prevents fluid communication in an opposite direction when the fluid pressure of the first fuel type is less than the pre-determined value. The back pressure relief valve 70 maintains a minimum pressure of the fuel supply to eliminate vapor and improve start time. The back pressure relief valve 70 may include any pressure sensitive valve suitable for use in the fuel supply system 24.

The cooling circuit 66 further includes a flow restriction device 74. The flow restriction device 74 restricts fluid flow through the cooling circuit 66 to a pre-defined fluid flow rate. The flow restriction device 74 restricts fluid flow through the return line 68 to maintain the pressure of the fuel supply system 24 while allowing the first fuel type to flow through the return line 68 when the bi-fuel engine 22 is operating. The flow restriction device 74 maintains supply pressure above a fuel vapor pressure to avoid liquid fuel vaporization when the bi-fuel engine 22 is operating on either the first fuel type, the second fuel type, or a combination of the first fuel type and the second fuel type. The flow restriction device 74 may include an orifice restriction or some other similar device.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a bi-fuel engine independently operable on any of a first fuel type, a second fuel type, or a combination of the first fuel type and the second fuel type; and
   a fuel supply system coupled to the bi-fuel engine and configured for supplying the bi-fuel engine with only the first fuel type, the fuel supply system including:
      a tank configured for storing a liquid supply of the first fuel type;
      a lift pump in fluid communication with the tank and configured for pressurizing and circulating the first fuel type;
      a direct injection pump assembly coupled to the bi-fuel engine and in fluid communication with the lift pump for receiving the first fuel type therefrom, and in fluid communication with the bi-fuel engine for supplying the first fuel type thereto; and
      a cooling circuit in fluid communication with the direct injection pump assembly and configured for circulating the first fuel type through the direct injection pump assembly to cool the first fuel disposed within the direct injection pump assembly when the bi-fuel engine is operating and being fueled by the second fuel type.

2. A vehicle as set forth in claim 1 wherein the direct injection pump assembly includes a low pressure inlet for receiving the first fuel type from the lift pump, and a high pressure outlet for supplying the first fuel type to the bi-fuel engine.

3. A vehicle as set forth in claim 2 wherein the direct injection pump assembly includes a high pressure pump drivenly coupled to the bi-fuel engine and interconnecting the low pressure inlet and the high pressure outlet in fluid communication, and operable to increase the pressure of the first fuel type.

4. A vehicle as set forth in claim 3 wherein the high pressure pump includes a low pressure side in fluid communication with the low pressure inlet, and a high pressure side in fluid communication with the high pressure outlet.

5. A vehicle as set forth in claim 4 wherein the cooling circuit includes an outflow in fluid communication with the low pressure side of the high pressure pump.

6. A vehicle as set forth in claim 5 wherein the fuel supply system further includes a supply line interconnecting the lift pump and the low pressure inlet of the direct injection pump assembly in fluid communication.

7. A vehicle as set forth in claim 6 wherein the cooling circuit includes a cooling line interconnecting the outflow and the supply line in fluid communication.

8. A vehicle as set forth in claim 7 wherein operation of the high pressure pump by the bi-fuel engine circulates the first fuel type from the low pressure side of the high pressure pump, through the cooling circuit, and back to the supply line.

9. A vehicle as set forth in claim 8 wherein the cooling circuit includes a heat exchanger in fluid communication with the cooling line and configured to remove heat from the first fuel type circulating therethrough.

10. A vehicle as set forth in claim 9 wherein the cooling circuit includes a check valve configured to allow fluid communication in a direction from the low pressure side of the high pressure pump, through the cooling circuit, and back to the supply line, and configured to prevent fluid communication in an opposite direction.

11. A vehicle as set forth in claim 10 wherein the direct injection pump assembly includes a check valve disposed between the low pressure inlet and the low pressure side of the high pressure pump, and configured to allow fluid communication in a direction from the low pressure inlet toward the low pressure side of the high pressure pump, and configured to prevent fluid communication in an opposite direction.

12. A vehicle as set forth in claim 5 wherein the cooling circuit includes a return line interconnecting the outflow and the tank in fluid communication.

13. A vehicle as set forth in claim 12 wherein actuation of the lift pump circulates the first fuel type through the low pressure side of the pump, through the return line, and back into the tank.

14. A vehicle as set forth in claim 13 wherein the cooling circuit includes a back pressure relief valve configured to allow fluid communication in a direction from the low pressure side of the high pressure pump, through the cooling circuit, and back to the tank when a fluid pressure of the first fuel type is greater than a pre-determined value, and configured to prevent fluid communication in an opposite direction when the fluid pressure of the first fuel type is less than the pre-determined value.

15. A vehicle as set forth in claim 14 wherein the cooling circuit includes a flow restriction device configured to restrict fluid flow through the cooling circuit to a pre-defined fluid flow rate.

16. A vehicle as set forth in claim 1 wherein the first fuel type includes one of gasoline or diesel fuel.

17. A vehicle as set forth in claim 1 wherein the second fuel type includes one of compressed natural gas, liquefied petroleum gas, or hydrogen.

18. A method of operating a vehicle, the method comprising:
   fueling a bi-fuel engine with only a second fuel type; and
   circulating a first fuel type through a fuel supply system having a direct injection pump assembly coupled to the bi-fuel engine, to cool the first fuel type in the direct injection pump assembly, when the bi-fuel engine is being fueled by the second fuel type, to prevent vaporization of the first fuel type within the direct injection pump assembly, wherein the fuel supply system supplies only the first fuel type to the bi-fuel engine.

19. A method as set forth in claim 18 wherein circulating the first fuel type includes circulating the first fuel type from a low pressure side of the direct injection pump assembly to one of a fuel system supply line upstream of an inlet of the direct injection pump assembly, or a fuel storage tank.

20. A method as set forth in claim 19 where in the first fuel type is gasoline, and the second fuel type is one of compressed natural gas, liquefied petroleum gas, or hydrogen.

* * * * *